US007420311B2

(12) United States Patent
Rupp et al.

(10) Patent No.: US 7,420,311 B2

(45) Date of Patent: Sep. 2, 2008

(54) BRUSH ARRANGEMENT FOR AN ELECTRIC MACHINE

(75) Inventors: Bernhard Rupp, Sulzfeld (DE); Christian Schindler, Buehlertal (DE); Mili Tarek, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 10/556,597

(22) PCT Filed: May 14, 2004

(86) PCT No.: PCT/DE2004/001007

§ 371 (c)(1),
(2), (4) Date: Nov. 14, 2005

(87) PCT Pub. No.: WO2005/008847

PCT Pub. Date: Jan. 27, 2005

(65) Prior Publication Data

US 2007/0013257 A1 Jan. 18, 2007

(30) Foreign Application Priority Data

Jul. 16, 2003 (DE) ................................ 103 32 302

(51) Int. Cl.
*H02K 5/14* (2006.01)
*H01R 39/38* (2006.01)

(52) U.S. Cl. ........................ 310/239; 310/242; 310/245

(58) Field of Classification Search ................. 310/239, 310/245, 247
See application file for complete search history.

(56) References Cited

U.S. PATENT DOCUMENTS 478,104 A * 7/1892 Hathaway ................... 310/247
2,695,968 A * 11/1954 Welch et al. ................ 310/246
3,171,050 A * 2/1965 Gordon ...................... 310/239
3,526,797 A * 9/1970 Jueschke .................... 310/245
4,420,705 A * 12/1983 Kimberlin ................... 310/242
4,613,781 A * 9/1986 Sanders ...................... 310/239
4,658,321 A * 4/1987 Lindner ....................... 361/25
5,114,351 A * 5/1992 Hoffmann .................... 439/13
5,696,418 A * 12/1997 Corbach et al. ............. 310/239
6,100,617 A * 8/2000 Carter et al. .................. 310/90
6,744,170 B1 * 6/2004 Du et al. ..................... 310/242
2002/0180287 A1 * 12/2002 Burger et al. ................. 310/85

FOREIGN PATENT DOCUMENTS

| | | | |
|---|---|---|---|
| DE | 1 931 104 | | 1/1970 |
| DE | 87 05 141 U1 | | 8/1987 |
| DE | 3843706 | * | 6/1990 |
| DE | 90 03 322 U1 | | 7/1991 |
| EP | 0 304 528 A2 | | 3/1989 |
| JP | 2003061315 A | * | 2/2003 |
| JP | 2003088049 A | * | 3/2003 |
| JP | 2003199300 A | * | 7/2003 |

* cited by examiner

*Primary Examiner*—Burton Mullins
(74) *Attorney, Agent, or Firm*—Ronald E. Greigg

(57) ABSTRACT

A brush device for an electric machine having at least one brush and at least one element such as a helical, scroll, or plunger spring for pressing each brush against a rotating contact element, for example a commutator. In at least one further element for example a spring tab, counteracts a lifting of each brush away from the contact element. To this end, the spring tab is inclined at an angle, as a result of which it exerts a weaker action when the brush moves in the direction toward the contact element than it does counter to this direction. As a result, the brush can be repositioned, but is prevented from lifting away from the contact element. This also reduces the danger of vibrations.

15 Claims, 3 Drawing Sheets

BRUSH ARRANGEMENT FOR AN ELECTRIC MACHINE

CROSS-REFERENCE TO RELATED APPLICATIONS

This application is a 35 USC 371 application Ser. No. of PCT/DE 2004/001007 filed on May 14, 2004.

BACKGROUND OF THE INVENTION

1. Field of the Invention

The present invention is directed to an improved brush device for an electrical machine.

2. Description of the Prior Art

A brush device of the type with which this invention is concerned has at least one brush and at least one element for pressing the brush against a preferably rotating contact element. As a rule, the pressing element is a helical spring or a scroll spring. The contact element can be a commutator or a slip ring. The pressing element should reposition the brush as it wears down and prevent it from lifting off, for example due the contact element being out of round. The more powerful the pressing element is designed to be, the less danger there is of a liftoff. But this also increases the wear. Finally, the necessary play in the guidance of the brush also permits the occurrence of undesirable vibrations due to fluctuations in the coefficient of friction.

SUMMARY AND ADVANTAGES OF THE INVENTION

The brush device for an electrical machine according to present invention has the advantage that it reduces the danger of the brush lifting away from the contact element. It permits a spring for pressing the brush to be embodied in a weaker form, which has a positive effect on the wear. It is also possible to reduce vibrations due to the required play in the guide. A more exact brush positioning is thus possible, which results in a more precise commutation and reduced noise. To this end, the brush device for an electric machine, which has a brush and at least one element for pressing the brush against a preferably rotating contact element, has an additional element that counteracts a lifting of the brush away from the contact element. In this case, the at least one element is preferably clamped at an end oriented away from the brush and rests against the brush with its other end. It is advantageous if, between the ends of the at least one element, at least one first section is provided, which exerts a more rigid action counter to the pressing direction than it does in the pressing direction, i.e. the at least one element provides more friction against the brush when it attempts to move away from the commutator than when the brush moves toward the commutator.

If noncircularities of the contact element require a certain residual flexibility, then a second section is provided between the at least one first section and the clamped end; this second section, at least in the direction counter to the pressing direction, exerts a weaker action than the at least one first section and preferably exerts the same elastic action both in and counter to the pressing direction.

If the brush-pressing element engages the brush obliquely in relation to the pressing direction, then the brush is less likely to vibrate in its guide.

In an inexpensive embodiment, the at least one pressing element is embodied as integrally connected to the at least one element.

If the contact element has only one rotation direction, then it is advantageous to situate the at least one element on the side of the brush oriented away from the rotation direction of the contact element. If the contact element has two different rotation directions, then it is advantageous for the at least one element to rest against a side of the brush situated in a plane with the rotation direction of the contact element. However, the element can also rest against both of the sides mentioned above.

In a preferred embodiment form, the at least one element is a spring tab; the spring tab rests with one edge against the brush and a section adjoining this is inclined in the direction of the contact element. In this way, the at least one element lends more friction against the brush moving away from the commutator than for the brush to move towards the commutator.

In an advantageous modification, the at least one element is a spring tab and the at least one pressing device is a scroll spring. In this connection, it is cost-effective for an element embodied in the form of a spring tab and a scroll spring for pressing the brush against the contact element to be connected to each other by means of a bracket.

An electric machine equipped with a brush device according to the present invention has the advantage that it can last longer because the brushes wear down less quickly.

BRIEF DESCRIPTION OF THE DRAWINGS

Other features and advantages of the invention will become apparent from the detailed description contained herein below, taken in conjunction with the drawings, in which.

DESCRIPTION OF THE PREFERRED EMBODIMENT

Figure 1:
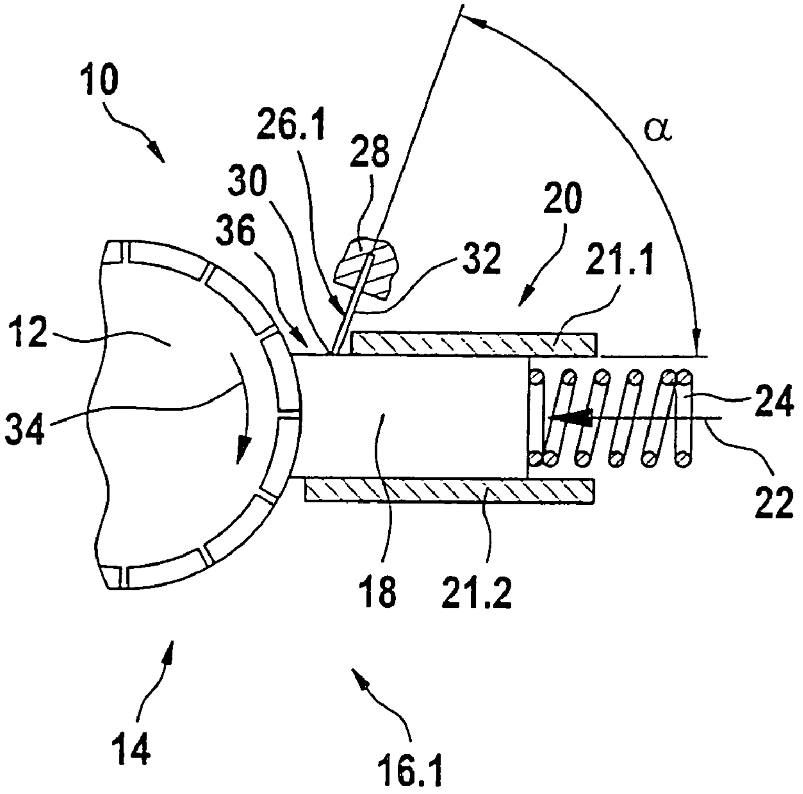
FIG. 1 shows a cross section through a brush device according to the invention in an electric machine.

FIG. 1 is a simplified, cross-sectional depiction of a part of an electric machine 10 more particularly a brush-equipped DC motor that can be used, for example, in a power window, a wiper drive unit, etc. of a motor vehicle. It can, however, also be a generator.

For the case in which it is a brush-equipped DC motor, the shaft 12 of the electric machine 10 supports a commutator 14. In the case of a generator, this would be a slip ring. In both cases, however, it is a contact element that preferably rotates.

A brush device 16.1 is also shown in the drawing. The brush device 16.1 has the required number of brushes 18, but has at least one brush 18 and at least one sliding contact. The brush 18 is made of carbon or another suitable material; it is contained in a guide 20 in a sliding fashion with play; the guide 20 is oriented toward the shaft 12 of the electric machine 10 and its two side walls 21.1 and 21.2 are visible in the drawing. The guide 20 is preferably part of a brush holder not shown in further detail. An arrow that points toward the shaft 12 indicates the pressing direction 22 in FIG. 1. The brush device also has a helical spring 24, which constitutes an element that presses the brush 18 against the commutator 14. The helical spring 24 can rest against a limit of the guide 20 at its end oriented away from the commutator 14.

In addition to the helical spring 24, a spring tab 26.1 is also provided, which rests against the brush 18 laterally and counteracts a lifting of the brush 18 off of the commutator 14. To this end, the spring tab 26.1 is clamped at an end 28 oriented away from the brush 18. The end 28 can, for example, be integrally connected to the brush holder, not shown in further detail, as part of a plastic injection molding process. The spring tab 26.1 can, however, also be a metal part that has been extrusion coated with plastic or can simply be pressed-fitted into place. With the other end 30 and its edge, the spring tab 26.1 rests against the brush 18. The section 32 of the spring tab 26.1 adjoining the end 30 and its edge is inclined in the direction of the commutator 14 and the pressing direction 22. This means that the section 32 has a higher coefficient of friction and exerts a more rigid action counter to the pressing direction 22 than it does in the pressing direction 22. Thus, the spring tab 26.1 provides greater resistance against the brush 18 moving away from the commutator 12 than it does for movement of the brush 18 towards the commutator 12. The inclination angle α between the pressing direction 22 and the section 32 is less than 90° and greater than 0°. Preferably, the angle lies in a range from 60° to 80°; a particularly favorable angle has turned out to be 70°. However, standard production tolerances of a few degrees must be taken into count.

Finally, the spring tab 26.1 shown in FIG. 1 is situated on the side 36 of the brush 18 oriented away from the rotation direction of the commutator 14 indicated by the arrow 34. As a result, during rotation, the spring tab 26.1 and the movement of the commutator 14 both act to press the brush 18 against the side wall 21.2. In FIG. 1, the spring tab 26.1 is embodied so that it is virtually impossible for the brush 18 to move counter to the pressing direction 22 since the inclination of the spring tab 26.1 provides a much greater coefficient of friction in this direction and thus prevents the brush from being deflected counter to the pressing direction 22. Preferably, the spring tab 26.1 inhibits or prevents the brush 18 from moving counter to the pressing direction. This inhibiting action, however, can also be accompanied by a certain residual elasticity. As the helical spring 24 repositions the brush 18 as it wears down, the spring tab 26.1 can pivot slightly away from the brush 18, although it is still able to rest against it. Care must be taken here to dimension the helical spring 24 so that it overcomes the spring force generated by the spring tab 26.1 and the friction in the guide 20.

Figure 2:
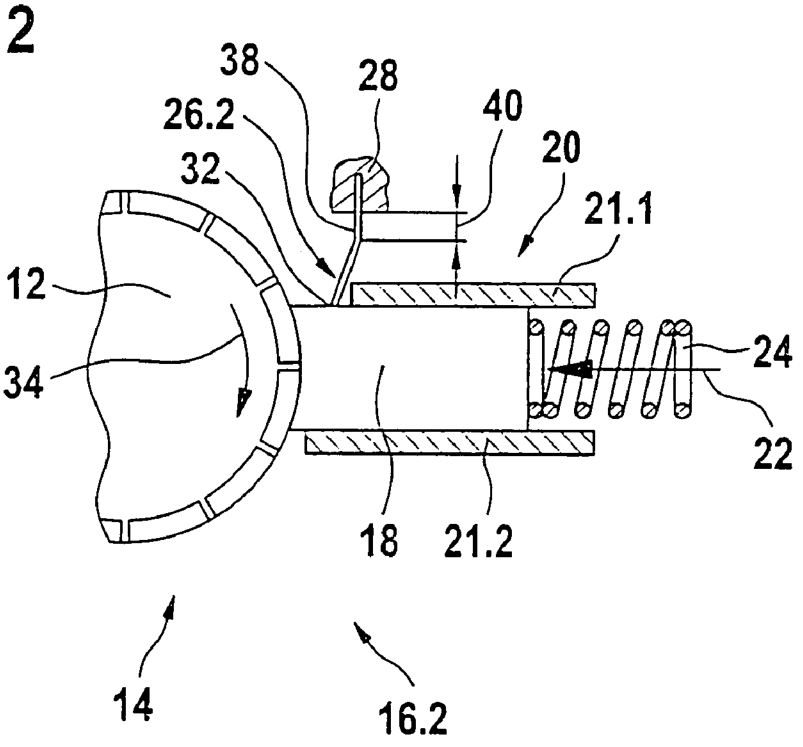
FIG. 2 shows a second, modified brush device.

FIG. 2 shows a modified spring tab 26.2. The remaining components are the same and have been provided with the same reference numerals as in FIG. 1, and reference is made to FIG. 1 with regard to these parts. Between the first section 32 of the spring tab 26.2 and the clamped end 28, there is a second section 38 that extends essentially perpendicular to the pressing direction 22. To this end, the spring tab 26 is bent between the two sections 32 and 38. As a result, the second section 38 exerts a weaker action than the first section 32, at least in the direction counter to the pressing direction 22, and consequently exerts an elastic action that is preferably equal both in and counter to the pressing direction 22. The second section 38 can also be inclined in relation to the position shown. It is also possible to use the length 40 of the second section 38 to influence the rigidity or elastic behavior of the spring tab 26.2. The elastic behavior of the spring tab 26.2 lends it a residual flexibility that is advantageous if the commutator 14 is very out of round.

Figure 3:
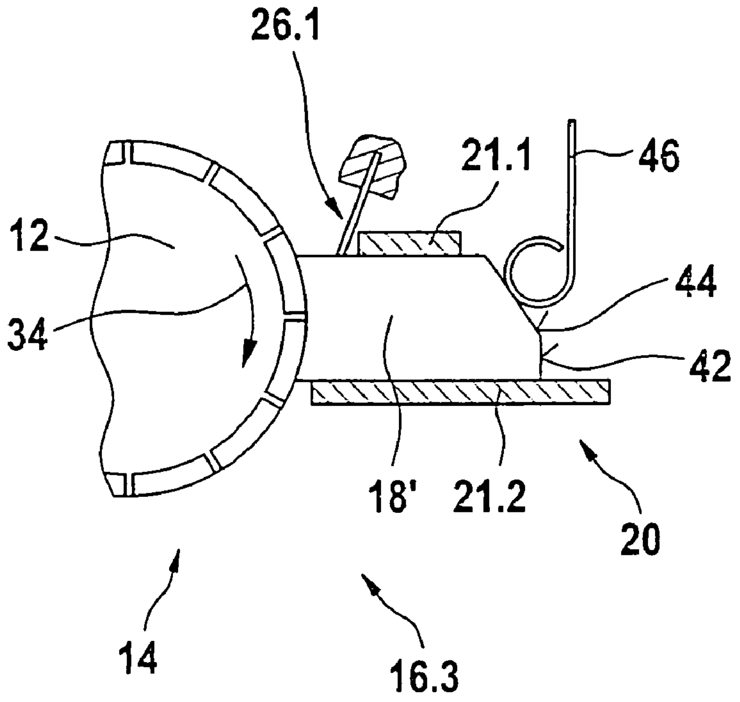
FIG. 3 shows a third, modified brush device.

FIG. 3 shows a brush device 16.3, which has a modified brush 18'. The remaining components are the same and have been provided with the same reference numerals as in FIG. 1, and reference is made to FIG. 1 with regard to these parts. The end 42 of the brush 18' oriented away from the commutator 14 has a bevel 44. A scroll spring 46, for example, engages this bevel. The spring force thus acts obliquely to the pressing direction 22 and obliquely to the brush 18', which further stabilizes the brush 18' in its guide 20. The spring force acts in the same direction as the rotation direction 34 of the commutator 14.

Figure 4:
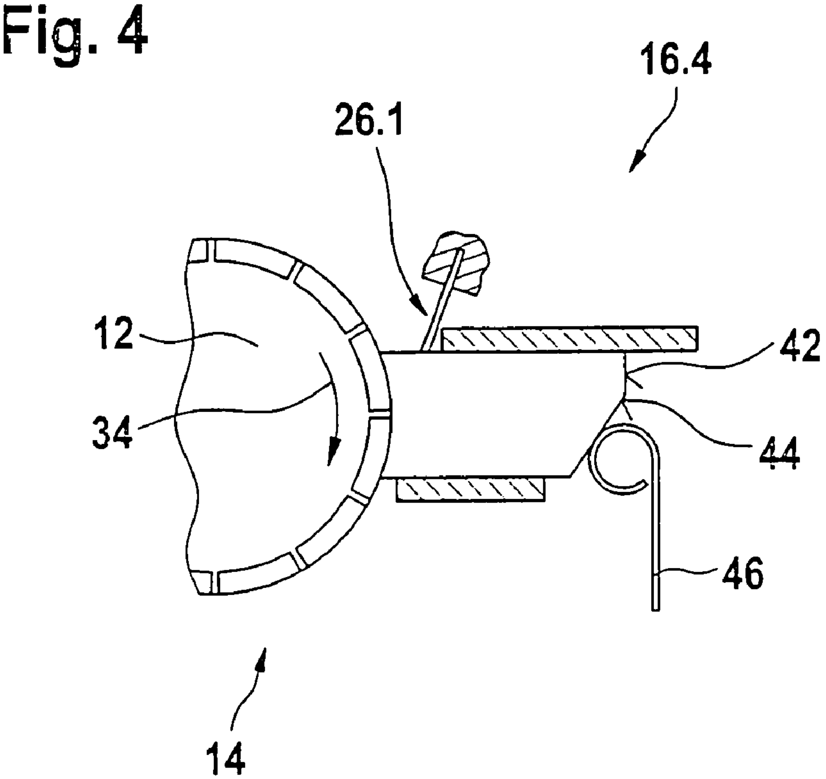
FIG. 4 shows a fourth, modified brush device.

FIG. 4 shows a brush device 16.4. The only difference from the device in FIG. 3 is that the brush 18' is rotated by 180° around its longitudinal axis. As a result, the spring force of the scroll spring 46 acts counter to the rotation direction 34 of the commutator 14, which also stabilizes the brush 18' in the guide 20.

Figure 5:
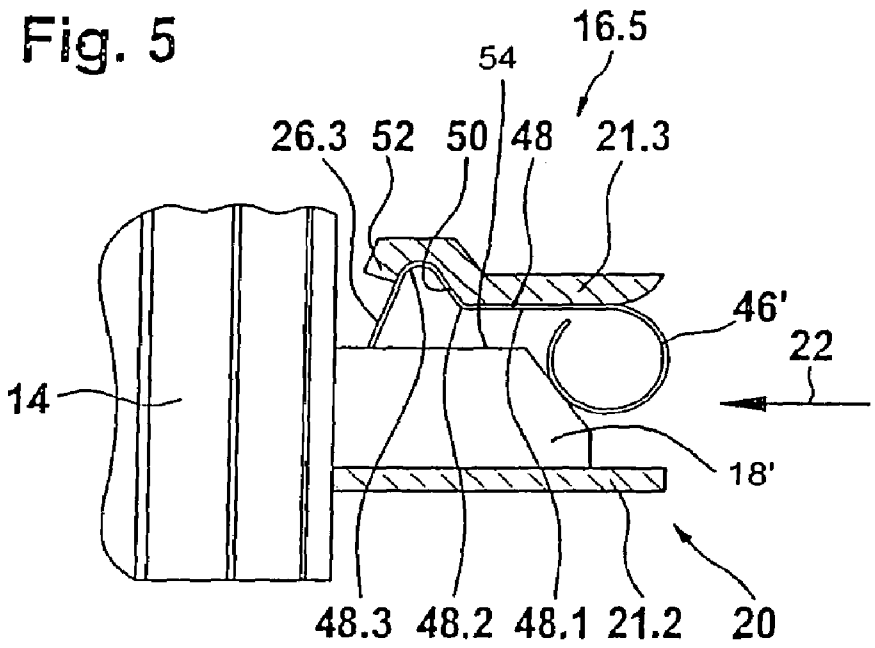
FIG. 5 shows a longitudinal section through a fifth, modified brush device.

FIG. 5 shows a particularly inexpensive brush device 16.5. In this instance, the spring tab 26.3 and the scroll spring 46' are embodied of one piece. The spring tab 26.3 is connected to the scroll spring 46' by means of a bracket portion 48. The bracket portion 48 has a first section 48.1 that adjoins the scroll spring 46' and extends parallel to the side wall 21.3 of the guide 20. The first section 48.1 is adjoined by a second section 48.2 that protrudes out from the plane of the first section 48.1 and is situated in a lateral recess 50 in the side wall 21. The second section 48.2 is adjoined via an arc-shaped third section 48.3 to the spring tab 26.3, which is oriented toward the brush 18'. The second section 48.2 and the spring tab 26.3 thus enclose a V-shape that is situated in the likewise V-shaped recess 50 of the side wall 21.3. The section 52 of the recess 50 that adjoins the end of the guide 20 oriented toward the commutator 14 is farther away from the brush 18' than the remaining region of the side wall 21.3. This facilitates installation of the brush device 16.5. It is naturally also possible to embody the recess in the form of a simple lateral through opening, etc.

Another aspect of the brush device according to FIG. 5 is that the spring tab 26.3 rests against the side 54 of the brush 18' that lies in a plane with the rotation direction of the commutator 14. This is advantageous in reversible electric machines 10. It is naturally also possible to embody or situate the spring tab 26 so that it rests against both this side 54 and the side 36 (FIG. 1).

Figure 6:
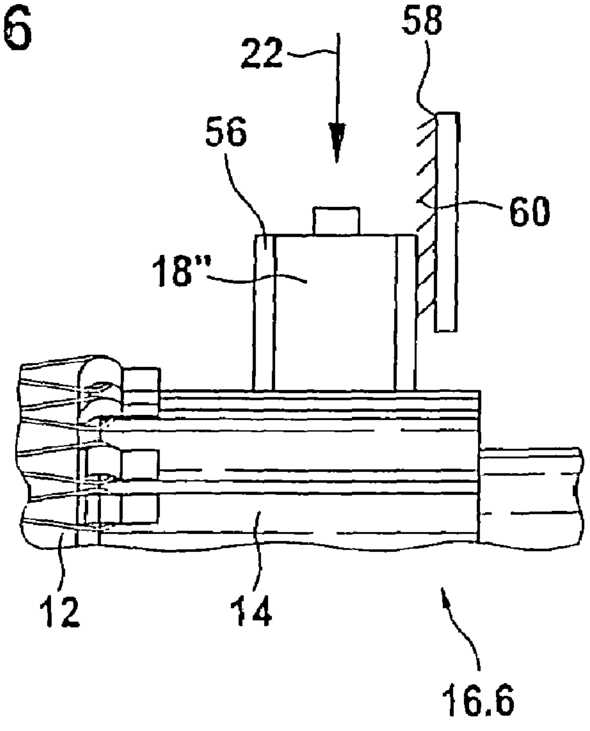
FIG. 6 shows a longitudinal section through a sixth brush device.

FIG. 6 shows a brush device 16.6 equipped with a plunger spring 56 and a brush 18" embodied in the form of a hammer brush. As elements that counteract a lifting of the brush 18", bristles 60 are provided on a surface 58 oriented parallel to the pressing direction 22 of the plunger spring 56; these bristles 60 are inclined in relation to the pressing direction 22 and rest against the plunger spring 56. As a result, the plunger spring 56 can move in the pressing direction 22, but is prevented or at least hindered from moving counter to the pressing direction 22. The bristles 60 thus indirectly counteract a lifting of the brush 18" via the plunger spring 56. The bristles 60 can also be provided on both sides of the plunger spring 56; they can be comprised of metal or plastic. In lieu of the bristles 60, it is also possible, for example, to provide a saw tooth geometry or a number of spring tabs.

In all of the above-mentioned elements 26.1, 26.2, 26.3, 60 that counteract a lifting of the brush 18, 18', 18", it is important that they exert a less rigid action in the pressing direction 22 than they do counter to the pressing direction 22. Preferably, they demonstrate an even more rigid behavior counter to the pressing direction than the springs 24, 46, 46', and 56 themselves.

The foregoing relates to a preferred exemplary embodiment of the invention, it being understood that other variants and embodiments thereof are possible within the spirit and scope of the invention, the latter being defined by the appended claims.

The invention claimed is:

1. A brush device for an electric machine, comprising
at least one brush,
at least one pressing element for pressing the at least one brush against a rotating contact element, and
in addition to the at least one pressing element, at least one further element that counteracts a lifting of the at least one brush away from the contact element, wherein the at least one further element has a lower coefficient of friction and exerts less friction against movement of the brush in the pressing direction than in the direction counter to the pressing direction, wherein said at least one further element comprises an elongated element having two ends, and wherein between the two ends there is at least one first section (38) that exerts an equal action in both the pressing direction and counter to the pressing direction.

2. The brush device according to claim 1, wherein the at least one further element is clamped at an end oriented away from the at least one brush and its other end rests against the at least one brush or against the pressing element.

3. The brush device according to claim 1, wherein said at least one brush is retained in a guide, and wherein the at least one element presses the at least one brush against a side wall of the guide.

4. The brush device according to claim 1, wherein the at least one further element inhibits a movement of the at least one brush counter to the pressing direction.

5. The brush device according to claim 1, further comprising a second section between the two ends which, and, at least counter to the pressing direction, the at least one first section exerts a weaker action than the second section.

6. The brush device according to claim 1, wherein a surface of the rotating contact element approaches the brush from one side of the brush, and the at least one pressing element is situated on the side of the at least one brush which is oriented away from the one side and/or the at least one further element rests against the one side of the at least one brush.

7. The brush device according to claim 1, wherein the pressing element of the at least one brush engages the at least one brush obliquely in relation to the pressing direction.

8. The brush device according to claim 1, wherein the at least one further element is a spring tab; wherein the spring tab rests with at least one edge against the at least one brush; and wherein an adjoining first section of the spring tab is inclined in the direction of the contact element.

9. An electric machine equipped with a brush device according to claim 1.

10. A brush device for an electric machine, comprising
at least one brush
at least one pressing element for pressing the at least one brush against a rotating contact element, and
in addition to the at least one pressing element, at least one further element that counteracts a lifting of the at least one brush away from the contact element, wherein the at least one further element has a lower coefficient of friction and exerts less friction against movement of the brush in the pressing direction than in the direction counter to the pressing direction, wherein said at least one further element comprises an elongated element having two ends, wherein between the two ends there is at least one first section (38) that exerts an equal action in both the pressing direction and counter to the pressing direction, and wherein the at least one further element is clamped at an end oriented away from the at least one brush and its other end rests against the at least one brush or against the pressing element.

11. The brush device according to claim 10, further comprising a second section between the two ends which, and, at least counter to the pressing direction, the at least one first section exerts a weaker action than the second section.

12. The brush device according to claim 10, wherein the pressing element of the at least one brush engages the at least one brush obliquely in relation to the pressing direction.

13. A brush device for an electric machine, comprising
at least one brush
at least one pressing element for pressing the at least one brush against a rotating contact element, and
in addition to the at least one pressing element, at least one further element that counteracts a lifting of the at least one brush away from the contact element, wherein the at least one further element has a lower coefficient of friction and exerts less friction against movement of the brush in the pressing direction than in the direction counter to the pressing direction, and wherein the at least one pressing element is integrally joined to the at least one further element.

14. The brush device according to claim 13, wherein the pressing element of the at least one brush engages the at least one brush obliquely in relation to the pressing direction.

15. A brush device for an electric machine, comprising
at least one brush
at least one pressing element for pressing the at least one brush against a rotating contact element, and
in addition to the at least one pressing element, at least one further element that counteracts a lifting of the at least one brush away from the contact element, wherein the at least one further element has a lower coefficient of friction and exerts less friction against movement of the brush in the pressing direction than in the direction counter to the pressing direction, wherein the at least one further element is a spring tab and the at least one pressing element is a scroll spring; and wherein the spring tab and a scroll spring are connected to each other by means of a bracket.

* * * * *